United States Patent
Deshpande et al.

(10) Patent No.: US 7,761,637 B2
(45) Date of Patent: Jul. 20, 2010

(54) SLAVE DEVICE WITH LATCHED REQUEST FOR SERVICE

(75) Inventors: Amrita Deshpande, Chandler, AZ (US); Alma Anderson, Chandler, AZ (US); Jean-Marc Irazabal, Santa Clara, CA (US); Stephen Blozis, Morgan Hill, CA (US); Paul Boogaards, Cary, NC (US)

(73) Assignee: NXP B.V., Eindhoven (NL)

( * ) Notice: Subject to any disclaimer, the term of this patent is extended or adjusted under 35 U.S.C. 154(b) by 105 days.

(21) Appl. No.: 11/913,061

(22) PCT Filed: May 1, 2006

(86) PCT No.: PCT/IB2006/051361

§ 371 (c)(1),
(2), (4) Date: Oct. 29, 2007

(87) PCT Pub. No.: WO2006/117748

PCT Pub. Date: Nov. 9, 2006

(65) Prior Publication Data

US 2008/0215779 A1    Sep. 4, 2008

Related U.S. Application Data

(60) Provisional application No. 60/676,367, filed on Apr. 29, 2005.

(51) Int. Cl.
*G06F 13/24* (2006.01)
(52) U.S. Cl. .......................... 710/260; 710/48; 710/110
(58) Field of Classification Search ................. 710/260, 710/110, 48, 8, 105
See application file for complete search history.

(56) References Cited

U.S. PATENT DOCUMENTS

| 5,062,044 | A  | * | 10/1991 | Asami et al. ................. 710/110 |
| 6,438,624 | B1 |   | 8/2002  | Ku et al. |
| 6,799,233 | B1 |   | 9/2004  | Deshpande et al. |
| 6,912,606 | B2 | * | 6/2005  | Fay .............................. 710/64 |
| 7,089,338 | B1 | * | 8/2006  | Wooten et al. ............... 710/110 |
| 2002/0050516 | A1 | * | 5/2002 | Kitchen ...................... 235/441 |
| 2004/0039835 | A1 |   | 2/2004 | Glenn et al. |
| 2005/0086396 | A1 |   | 4/2005 | Bernard et al. |

(Continued)

OTHER PUBLICATIONS

"AN469 I2C/SMBUS General Purpose I/O Expanders" Philips Application Note, Jan. 20, 2005.

(Continued)

*Primary Examiner*—Clifford H Knoll

(57) ABSTRACT

Consistent with one example embodiment, communications systems, using a serial data transfer bus having a serial data line and a clock line used to implement a communications protocol, incorporate latched service requests. Methods for one or more slave devices to request service from a master device involve detecting a condition that asserts a request for service signal, at a common node independent from the serial data transfer bus, to a master device of the bus. The request for service is latched it, within the slave, such that the request for service remains asserted regardless of a change in the detected condition. The request for service is de-asserted in response to interrogation of the slave, using the serial data transfer bus, by the master device. Devices may be configured as general purpose Input/Output devices, CODEC arrangements, or other slave devices, and may conform to I²C and/or SMBus serial communication specifications.

24 Claims, 3 Drawing Sheets

U.S. PATENT DOCUMENTS

2005/0165989 A1* 7/2005 Kim .......................... 710/260
2006/0110157 A1* 5/2006 Tritschler et al. ............. 398/22

OTHER PUBLICATIONS

Deshpande, Amrita "Design of a Behavioral (Register Transfer Level, RTL) Model of the Inter-Integrated Circuit or I2C-Bus Master-Slave Interface" Master's Thesis of Amrita Deshpande, University of New Mexico, 1999.

"The I2C Bus Specification" Document No. 9398-393-4001-1, Jan. 2000, Version 2.1 by Philips Semiconductors.

* cited by examiner

SLAVE DEVICE WITH LATCHED REQUEST FOR SERVICE

The present invention is directed generally to communication devices and methodologies, and more particularly, to methods and arrangements for latching a request for service by a slave device on a communication bus.

The Inter-Integrated Circuit (I2C) bus developed by Philips Corporation allows integrated circuits to communicate directly with each other via a simple bi directional 2-wire bus (plus power and ground). A device connects to each of the two wires on the bus, one serial data line (SDA) for the communication of data, and the other serial clock line (SCL) for the control and synchronization of the communication of data between the devices. Each device is connected in parallel to each of the other devices, and each of the bus lines, SDA and SCL, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

Each device that is connected to an I2C bus is identifiable by an address, and can operate as either a transmitter or a receiver, or both. Data transfers are effected using a master-slave communications protocol. A master is a device that initiates a data transfer and generates the clock signals to permit the transfer; any device that is addressed is considered a slave for this transfer. The data transfer can be initiated by a master to either transmit data to the slave (herein designated as write), or to request data from the slave (herein designated as read). For example, an output device, such as a display screen, is typically not able to initiate a data transfer, and therefore would be configured to only operate as a slave device. A microprocessor, on the other hand, will typically be configured to operate as either a master or a slave, as the situation demands.

In a quiescent state, both the SDA and SCL bus lines are in the logic-high state (herein designated as high, or logic state of 1). A master initiates a data transfer by asserting a transition to a logic-low state (herein designated as low, or logic state of 0) on the SDA line while the SCL line is high; this is termed a START condition. Thereafter, the master toggles the SCL line to control the synchronization of the data transfer; data value changes occur on the SDA line when the SCL clock is low, and the state of the SDA line is considered valid only when the SCL clock is high.

Multiple STARTs can be asserted to effect a series of data transfers within the same transfer session. Generally, each data transfer requires an acknowledgement from the addressed recipient of the data transfer. To terminate the data transfer, the host asserts a low-to-high transition on the SDA line while the SCL clock is high; this is termed a STOP condition. Thereafter, any device may assume control of the bus as a master by asserting a high-to-low transition on the SDA line, as above. Note that, for ease of reference, the term assert is used herein for effecting, or attempting to effect, the specified logic state. In the example of a transition to a logic-high state, this is typically provided by a release of the bus from a forced pull-down state by the asserting device. This assertion of a logic-high state allows the aforementioned pull-up devices on the bus to bring the bus to a logic-high state, unless another device is also forcing the pull-down state.

The general format of an I2C data transfer involves signals on an SDA line and an SCL line forming the I2C bus. A START condition (S) corresponds to high-to-low transition of the signal on the SDA line while the SCL line is high. After the START, the host transmits an address, nominally seven bits, followed by a read/write-not indicator. After transmitting the address and the direction of data transfer (R/W-), the host releases the SDA line, allowing it to rise to a logic-high level. If a slave device recognizes its address, the slave device transmits an acknowledge signal (ACK) by pulling the bus low. The absence of a low signal when the host releases the SDA line, therefore, indicates a non-acknowledgement (NAK). If the address is acknowledged, via a low at SDA, the transmitting device transmits the data. If the direction of data transfer is a "read" relative to the host, then the slave device is the transmitting device; if the direction is a "write" relative to the host, then the master device is the transmitting device. The transmitting device releases control of the SDA line, and the receiving device acknowledges the receipt of the data by asserting a logic-low value on the SDA line. If the data is acknowledged, the transmitter sends additional data. This process continues until the entirety of the data is communicated, or until a transmitted data item is not-acknowledged. The master can subsequently reassert a START signal, and repeat the process above, or, can assert a STOP signal (P) to terminate this data-transfer session.

The above interface protocol can be implemented in a variety of ways. To minimize the development time for programming or designing an I2C interface, a variety of general-purpose interface schemes have been published. "DESIGN OF A BEHAVIORAL (REGISTER TRANSFER LEVEL, RTL) MODEL OF THE INTER-INTEGRATED CIRCUIT OR I2C-BUS MASTER-SLAVE INTERFACE", Master's Thesis of Amrita Deshpande, University of New Mexico, 1999, discloses an I2C master interface and slave interface that is intended to be embodied in an I2C device, and is incorporated by reference herein. By providing a verified I2C interface, system designers need not address the details of the I2C specification and protocol. Both the master and the slave interfaces of this thesis are state-machine based. Further description of state-machine based systems and methods are described in U.S. Pat. No. 6,799,233, which is hereby incorporated herein by reference.

Various aspects of the present invention are directed to methods and arrangements for latching a request for service by a slave device on a communication bus in a manner that addresses and overcomes the above-mentioned issues.

Consistent with one example embodiment, the present invention is directed to a slave device having a data line circuit configured to accept data from a bus, and a request for service circuit configured to assert a request for service, at a node independent from the bus, in response to a desire for servicing. The request for service circuit includes a latch configured to latch the request for service as asserted until the slave device is serviced using the data line circuit.

In other embodiments, the latch is implemented in software, and/or the latch is programmably configurable to latch the request for service circuit as asserted until the slave device is serviced or to not latch the request for service circuit. Embodiments of devices in accordance with the present invention may be configured as a general purpose Input/Output devices, CODEC arrangements, or other slave devices. Embodiments of devices in accordance with the present invention may conform to an I2C serial communication specification, an SMBus serial communication specification, or other serial data transfer bus specification.

Embodiments of methods in accordance with the present invention are directed to communications systems using a serial data transfer bus that has a serial data line and a clock line used to implement a communications protocol. The method for one or more slave devices to request service from a master device involves detecting a condition, within the slave device, that asserts a request for service signal, at a common node independent from the serial data transfer bus, to a master device of the serial data transfer bus. The request for service is latched, within the slave device, such that the request for service remains asserted regardless of a change in the detected condition. The request for service is de-asserted in response to interrogation of the slave device, using the serial data transfer bus, by the master device.

Embodiments of methods may further involve storing values of one or more inputs to the slave device, comparing the stored values to current conditions of the one or more inputs, and determining that the stored values are different from the current conditions.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 1A:
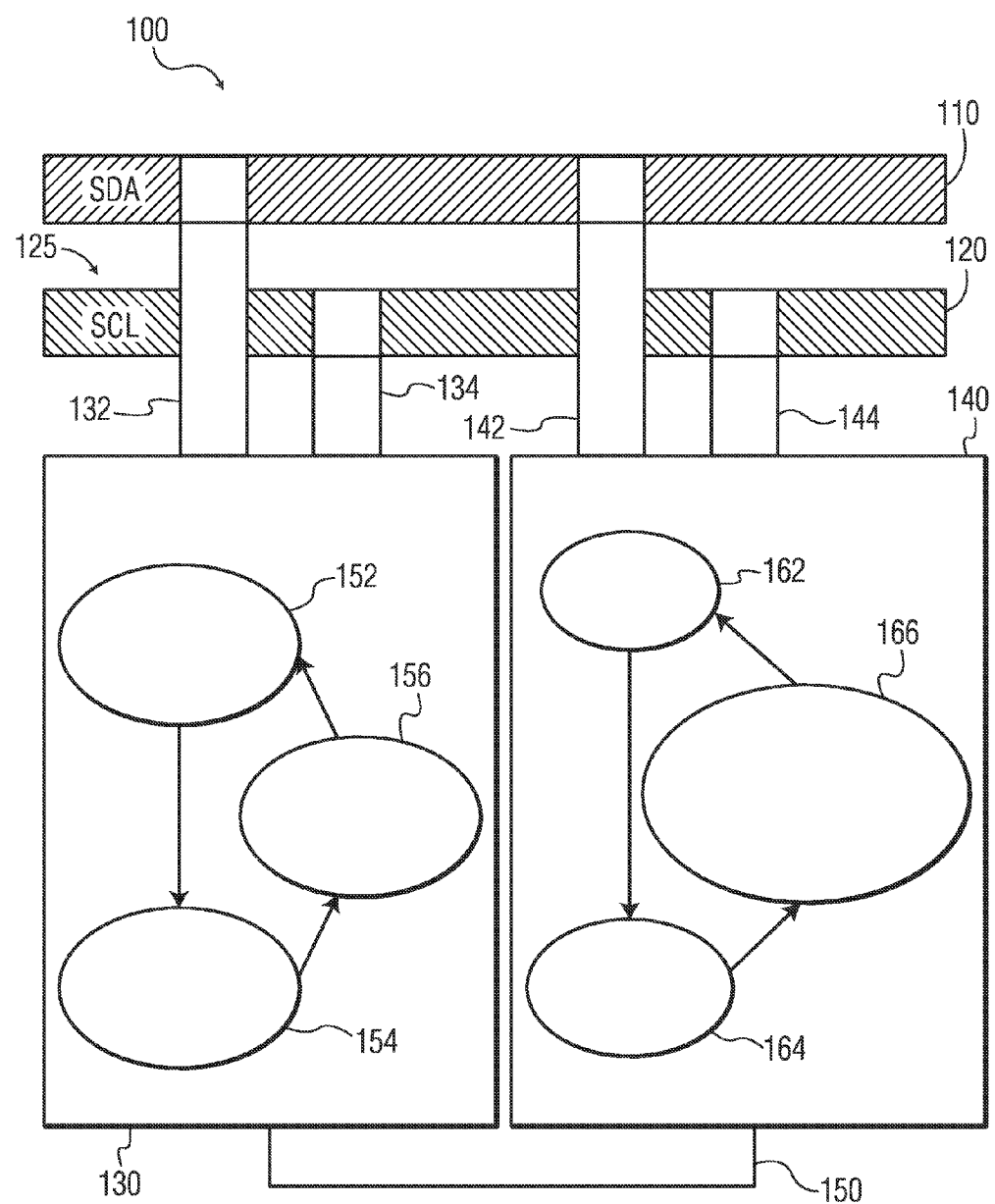
FIG. 1A is a block diagram of a data communications system implementing latched service requests in accordance with embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is generally applicable to methods and arrangements for latching a request for service by a slave device on a communication bus. The invention has been found to be particularly advantageous for Inter Integrated Circuit (I2C) serial data communications busses, but is also advantageous for other busses and communications protocols, such as system management bus (SMBus) architectures and/or protocols or other serial data communications systems. For purposes of illustration, and not of limitation, the invention will be described in the context of an I2C bus having a master device controlling communication to a slave device.

Masters control the communication with I2C slaves on the I2C bus architecture. I2C slaves find numerous applications in fields ranging from cell phones, PDAs and SmartPhones to LCD TVs, Medical Equipment, Gaming, and other applications. One particular application of an I2C slave is as a General Purpose Input/Output (GPIO) device. In this type of device, there are a number of multi-function pins that can be used as inputs or outputs. When used as inputs, these pins typically indicate the state of certain signals that are being monitored.

Sometimes it is desirable to monitor the changes in the values of the input pins and pass on that information to a system control master, like a microcontroller. This may be done via an INTERRUPT pin to indicate a request for service by the master. When asserted, the service request signal (herein designated INTERRUPT) indicates to the microcontroller that there has been a change in the values of the input signals. For example, the GPIO may store the initial values of the input pins, and then when any one of the inputs change, compare the stored values with the current values, and if different, generate an INTERRUPT signal.

One problem with known I2C slave devices is, if the input pin changes back to its initial condition, the INTERRUPT signal gets de-asserted, and the information that there had been a change in the input signal is lost if the system master did not get a chance to read the input values while the INTERRUPT was asserted. Devices in accordance with the present invention latch the change in the input signal such that even if the signal toggles back to its original value, the INTERRUPT stays asserted. In this way, the change information is not lost. In other embodiments in accordance with the present invention, the slave device is programmable via the I2C-bus between non-latched and latched service requests.

According to one example embodiment of the present invention, one or more slave devices on a serial data communication bus request service from a master device by detecting a condition, within the slave, that asserts a request for service signal, at a common node independent from the serial data transfer bus, to a master device of the serial data transfer bus. The request for service is latched, within the slave, such that the request for service remains asserted regardless of a change in the detected condition. The request for service is de-asserted in response to interrogation of the slave, using the serial data transfer bus, by the master device. Slave devices may be configured as general purpose Input/Output devices, CODEC arrangements, or other slave devices. The communication system may conform to I2C, SMBus, and/or other serial communication specifications.

FIG. 1A is a block diagram of a data communications system 100 implementing latched service requests in accordance with embodiments of the present invention. An SDA line 110 and an SCL line 120 are arranged as an I2C data bus 125. A master device 130 and a slave device 140 are attached to the I2C data bus 125. The master device 130 is electrically connected to the I2C data bus 125 using a clock connection 134 and a data connection 132 electrically connected to the SCL line 120 and the SDA line 110 respectively.

The slave device 140 is electrically connected to the I2C data bus 125 using a clock connection 144 and a data connection 142 electrically connected to the SCL line 120 and the SDA line 110 respectively. A service request node 150, separate from the I2C data bus 125, is illustrated as electrically connecting the master device 130 to the slave device 140. The service request node 150 may be used to assert an INTERRUPT in accordance with the present invention. Although the service request node 150 is illustrated in FIG. 1A as a physical connection, e.g. a trace, the service request node 150 may be routed through an intermediate device. For example, the service request node 150 may alternately be an interrupt request pin on the slave device 140 that is communicatively coupled to a microprocessor (not shown) that performs an interrupt routine, wherein the microprocessor detects the service request from the slave device 140 and communicates with the master device 130 to initiate the service of an INTERRUPT asserted by the slave device 140.

In addition to any other actions performed by the master device 130, the master device 130 includes at least three states 152, 154, 156 for the servicing of an INTERRUPT. State 152, sensing service request on the service request node 150, is the quiescent state for the servicing of an INTERRUPT. The master device 130 performs its other duties, if any, until an INTERRUPT is asserted on the service request node 150. The master device 130 may sense the condition of the service request node 150 continuously, or may sense the condition of the service request node 150 at regular intervals, or may sense the condition of the service request node 150 in response to a prompt.

If the master device 130 senses an INTERRUPT at the service request node 150, the master device 130 acquires I2C data bus 125 control at state 154. The master device 130 acquires I2C data bus 125 control using arbitration methodologies such as further described in the "I2C bus specification", a version of which is document number 9398-393-4001-1, January 2000, version 2.1, available from Philips Semiconductors. The master device 130 services the slave's INTERRUPT at state 156, and returns to its quiescent state 152.

The slave device 140 is illustrated in FIG. 1A as a GPIO device, which compares initial conditions to current conditions at one or more Input/Output (I/O) pins, and asserts a latched INTERRUPT at the service request node 150 in accordance with embodiments of the present invention. At a state 162, the slave device 140 senses a condition for which servicing is desired by the master device 130. The slave device 140 latches a request for service 164 on the service request node 150. Regardless of a change in the conditions that initiated the request for service 164, the INTERRUPT remains asserted at the service request node 150, thereby latching the INTERRUPT at least until the slave device 140 is addressed by the master device 130 and serviced. In response to the slave device 140 being addressed by the master device 130 and serviced for the INTERRUPT, the slave device 140 de-asserts 166 the INTERRUPT on the service request node 150.

Figure 1B:
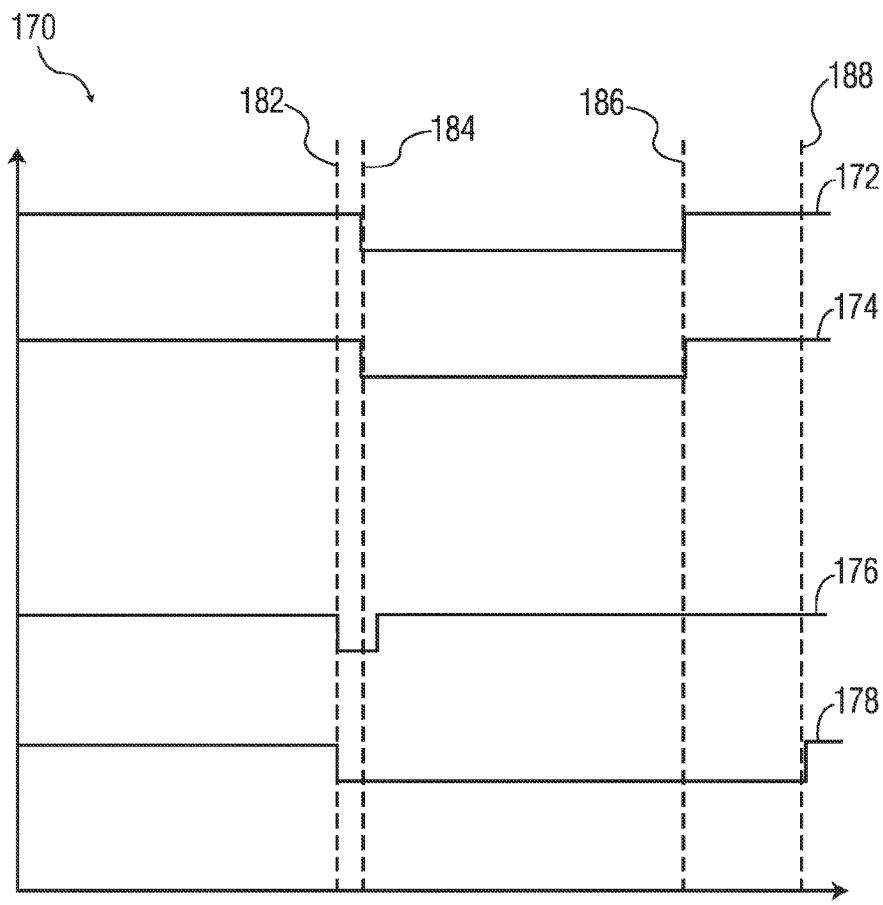
FIG. 1B is a graph of signal lines for a data communications system implementing non-latched and latched service requests in accordance with embodiments of the present invention.

FIG. 1B is a graph 170 of signal lines for a data communications system implementing latched service requests, that latch asynchronous INTERRUPTS in accordance with embodiments of the present invention. Plot 172 corresponds to the logic state of an I/O pin of a GPIO slave device in accordance with the present invention, and plot 174 corresponds to the logic state of a service request pin of the GPIO slave device. The plots 172 and 174 illustrate a correspondence between the logic state of the I/O pin and the service request pin. In the example illustrated in FIG. 1B, an event 184 causes the plot 172 to exhibit a logic state 1 to 0 transition, which is followed as illustrated in the logic state 1 to 0 transition of the plot 174. An event 186 causes the plot 172 to exhibit a logic state 0 to 1 transition, which is also followed as illustrated in the logic state 0 to 1 transition of the plot 174. If the slave device INTERRUPT, in this example the low state of the plot 174 between the event 184 and the event 186, has not been serviced by a master device on the bus between the times of event 184 and event 186, then information regarding the INTERRUPT may be lost.

Plot 176 corresponds to the logic state of an I/O pin of a GPIO slave device with latched INTERRUPT in accordance with the present invention, and plot 178 corresponds to the logic state of a service request pin of the GPIO slave device. The plots 176 and 178 illustrate a correspondence between the logic state of the I/O pin and the service request pin, in accordance with a latching INTERRUPT. In the example illustrated in plots 176, 178 in FIG. 1A, an event 182 causes the plot 176 to exhibit a logic state 1 to 0 transition, which is followed as illustrated in the logic state 1 to 0 transition of the plot 178, asserting a latched INTERRUPT on the service request line. The event 182 results in a logic state 0 to 1 transition just after the event 184, which is not followed by the plot 178 (e.g. the INTERRUPT is not de-asserted). In response to the slave device being addressed on the bus, and the INTERRUPT being serviced, such as by an event 188, the plot 178 illustrated a de-assertion of the INTERRUPT by a logic state 0 to 1 transition. Even though the event 184 may have been a transient asynchronous condition, latching the service request in accordance with the present invention assures that the slave device is serviced by a master on the bus to address the transient asynchronous condition.

Figure 2:
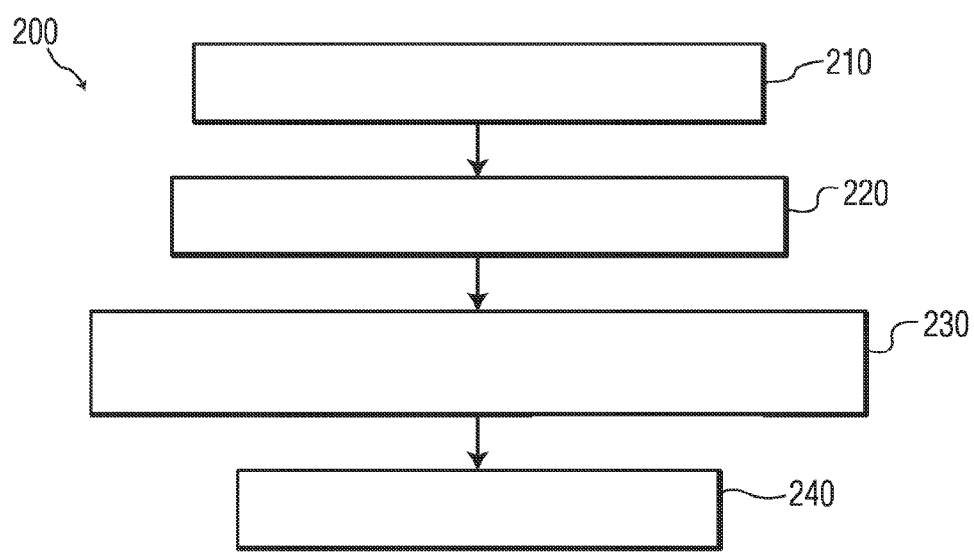
FIG. 2 is a flow chart of a method for implementing latched service requests in accordance with embodiments of the present invention.

FIG. 2 is a flow chart 200 of a method for implementing latched service requests in accordance with embodiments of the present invention. A condition that requires servicing is detected 210 by a slave device. For example, a GPIO slave device may monitor an input pin for a change in logic state. If the logic state at the monitored pin changes, the slave device asserts and latches a request for service 220, such as by asserting an INTERRUPT on a service request node. In response to the slave device being addressed by a master device on the bus, and servicing the INTERRUPT 230, the slave device de-asserts the request for service 240, such as by removing the INTERRUPT from the service request node. The use of a GPIO device as the slave device implementing the method 200 is for purposes of illustration only, and not for limitation.

Figure 3:
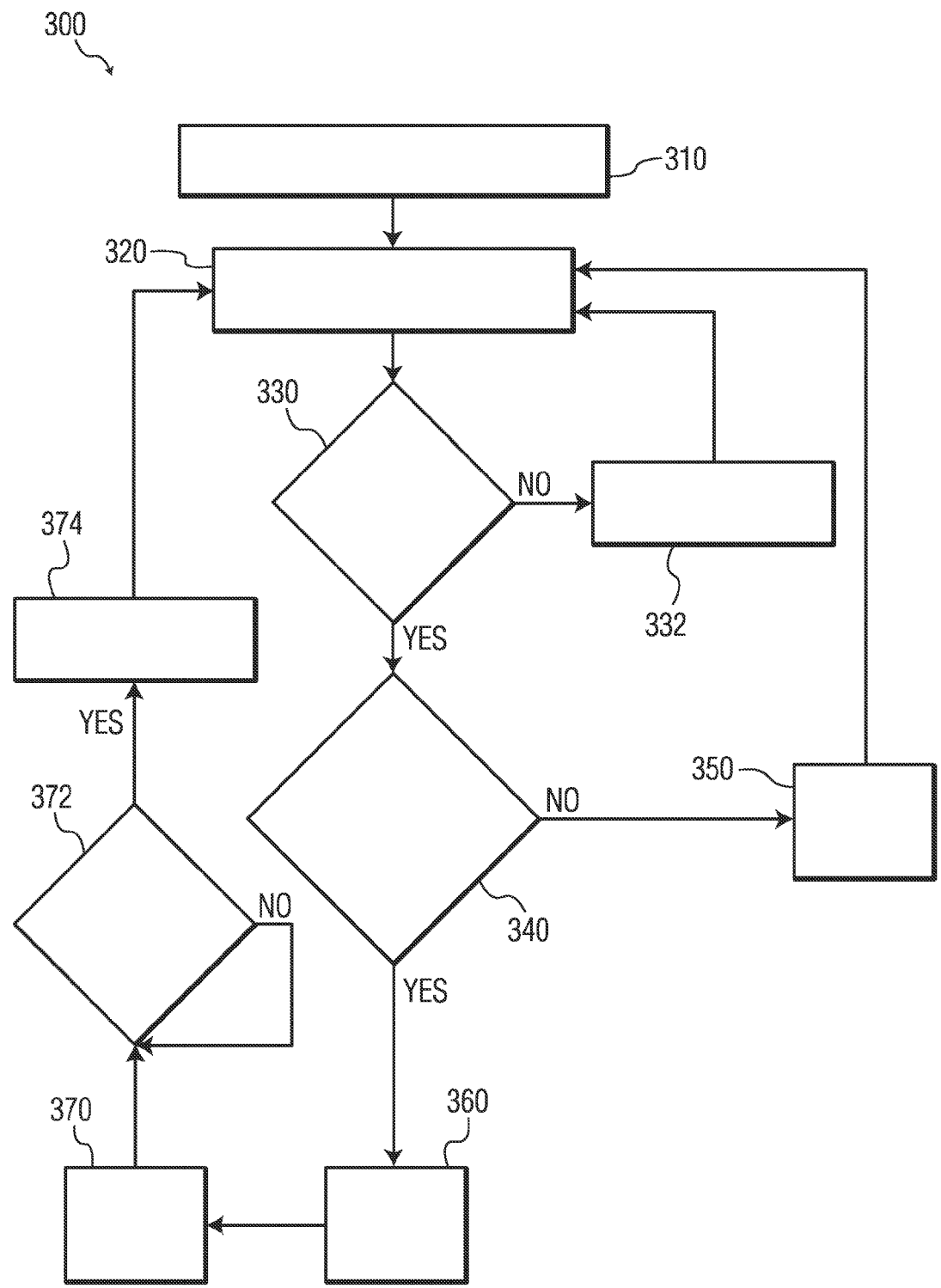
FIG. 3 is a flow chart of another method for implementing programmable latched service requests in accordance with other embodiments of the present invention.

FIG. 3 is a flow chart of a method 300 for implementing programmable latched service requests in accordance with other embodiments of the present invention. For purposes of illustration, and not of limitation, the method 300 will also be described in the context of a GPIO slave device on an I2C bus.

The slave device stores initial input conditions 310, such as by using volatile and/or non-volatile memory, for example. The stored input conditions are compared to current conditions 320. If the stored input conditions are not different than current conditions at decision 330, then no service request is asserted 332 and further comparisons 320 are performed. If the stored input conditions are different than current conditions at decision 330, then a check 340 is made to determine if latched service requests are desired. If the check 340 indicates that latching is not desired, then a service request is asserted 350 and further comparisons 320 are performed. If the check 340 indicates that latching is desired, then a service request 360 is both asserted and latched 370.

The slave device then waits for addressing and service of the service request by a master using the bus. If the slave device is both addressed by the master using the bus, and the desired service is performed 372, then the service request is de-asserted 374 and further comparisons 320 are performed.

As is known in the art, watchdog timers or other methodologies may be used to de-assert the service request 374, thereby removing the service request latch 370, in the event that unlatching of the service request is desired, (such as for a hardware reset or software re-boot, for example).

Hardware, firmware, software or a combination thereof may be used to perform the various embodiments of service request latching and programmable service request latching described herein. The servicing function used in connection with the invention may reside in a master device as described, or may alternatively reside on a stand-alone or networked computer attached to the serial data communications system 100. The serial data communications system 100 illustrated in FIG. 1 is an example structure that can be used in connection with such communications systems, computers, or other computer-implemented devices to carry out operations of the present invention.

The example master device 130 illustrated in FIG. 1, suitable for performing the servicing functions in accordance with the present invention, typically includes a central processor (CPU) coupled to random access memory (RAM) and/or some variation of read-only memory (ROM). The ROM may also be other types of storage media to store programs, such as programmable ROM (PROM), erasable PROM (EPROM), etc. The processor may communicate with other internal and external components through input/output (I/O) circuitry and/or other bussing, to provide control signals, communication signals, and the like.

The master device 130 may also include one or more data storage devices, including hard and floppy disk drives, CD-ROM drives, and other hardware capable of reading and/or storing information, such as DVD, etc. In one embodiment, software for carrying out the service request latching and programmable service request latching in accordance with the present invention may be stored and distributed on a CD-ROM, diskette, or other form of media capable of portably storing information. These storage media may be inserted into, and read by, devices such as a CD-ROM drive, the disk drive, etc. The software may also be transmitted to the computing arrangement via data signals, such as being downloaded electronically via a network, such as the Internet. Further, as previously described, the software for carrying out the functions associated with the present invention may alternatively be stored in internal memory/storage of the computing device, such as in the ROM.

Any resulting program(s), having computer-readable program code, may be embodied within one or more computer-usable media such as memory devices or transmitting devices, thereby making a computer program product or article of manufacture according to the invention. As such, the terms "computer readable medium," "article of manufacture," "computer program product" or other similar language as used herein are intended to encompass a computer program which exists permanently, temporarily, or transitorily on any computer-usable medium such as on any memory device or in any transmitting device.

Each feature disclosed in this specification (including any accompanying claims, abstract, and drawings), is replacable by alternative features having the same, equivalent or similar purpose, unless expressly stated otherwise. Thus, unless expressly stated otherwise, each feature disclosed is one example only of a generic series of equivalent or similar features.

Accordingly, various embodiments have been described as example implementations of the present invention for addressing requests for service from multiple devices attached to bus structures. In each such implementation, the request for service may be latched to assure servicing of the request for service by a master on the bus irrespective of transient or changing input conditions.

The present invention should not be considered limited to the particular examples described above. Various modifications, equivalent processes, as well as numerous structures to which the present invention may be applicable fall within the scope of the present invention. For example, request for service latching arrangements can be implemented using a similarly constructed one-way or two-way interface for communication between devices on a common bus, such as an SMBus or other bus arrangement. Such variations may be considered as part of the claimed invention, as fairly set forth in the appended claims.

What is claimed is:

1. A communications system using a serial data transfer bus that has a serial data line and a clock line used to implement a communications protocol, comprising:
    a master device attached to the serial data transfer bus and configured to control bi-directional serial communications over the serial data line;
    a request for service node, independent from the serial data transfer bus, the request for service node accessible by the master device, and the request for service node dedicated to use for requests for service; and
    a slave module electrically coupled to the serial data transfer bus, the slave module configured to detect a change of an input of the slave module, to respond to the detected change by latching a request for service on the request for service node, and to remove the latched request for service in response to the slave module being interrogated by the master device using the serial data transfer bus.

2. The system of claim 1, wherein the slave module comprises: a memory configured to store initial values of one or more inputs of the slave module; and
    a comparison system configured to compare the stored initial values to current values of the one or more inputs and to latch the request for service at the request for service node responsive to the current value of one of the inputs being different from the stored initial value of the one input.

3. The system of claim 1, wherein the slave module is configured as a general purpose Input/Output device, and the slave module is further configured to detect a change in logic state of the input of the slave device and to latch the request for service on the request for service node such that the request for service remains latched regardless of a further change in the logic stage at the input of the slave device.

4. The system of claim 1, wherein the slave module is configured as a decoder of a CODEC arrangement.

5. In a communications system using a serial data transfer bus that has a serial data line and a clock line used to implement a communications protocol, a method for one or more of a plurality of slave devices to request service from a master device, comprising:
    detecting a change in an input value of an input of one of the slave devices;
    responsive to the detected change, asserting a request for service signal, at a common node independent from the serial data transfer bus, and the node dedicated to use for request for service signals, to the master device of the serial data transfer bus;
    latching the request for service, within the slave device, such that the request for service remains asserted regardless of a further change in the input value of the input of the one slave device; and
    de-asserting the request for service in response to interrogation of the one slave device, using the serial data transfer bus, by the master device.

6. The method of claim 5, further comprising: storing initial values of one or more inputs to the slave device; comparing the stored values to current values of the one or more inputs; and asserting the request for service signal responsive to one of the stored initial values being different from the corresponding current value, wherein the stored initial values are initial logic states of the one or more inputs and the current values are current logic states of the one or more inputs.

7. The method of claim 5, wherein the serial data transfer bus conforms to an I2C serial communication specification.

8. The method of claim 5, wherein the serial data transfer bus conforms to an SMBus serial communication specification.

9. The method of claim 5, wherein the slave device is configured as a general purpose Input/Output device.

10. The method of claim 5, wherein the slave device is configured as a decoder of a CODEC arrangement.

11. An I2C slave device, comprising:
   a data line circuit configured to accept data from an I2C bus;
   a request for service circuit configured to assert a request for service, at a node independent from the I2C bus, the node dedicated to use for requests for service, in response to the slave device detecting a change in an input value of an input of the slave device, and
   a latch configured to latch the request for service circuit as asserted until the slave device is serviced using the data line circuit.

12. The device of claim 11, wherein the latch is implemented in software, and wherein the input value in a logic state of the input and the slave device is configured to detect a change in the logic state of the input by comparing the logic state of the input to a stored logic state of the input.

13. The device of claim 11, wherein the latch is programmably configurable to latch the request for service circuit as asserted until the slave device is serviced or to not latch the request for service circuit.

14. The method of claim 11, wherein the slave device is configured as a general purpose Input/Output device.

15. The method of claim 11, wherein the slave device is configured as a decoder of a CODEC arrangement.

16. A computer-readable medium having computer-executable instructions for executing a request for service latch in an I2C slave device, the computer-executable instructions performing steps comprising:
   detecting a change in an input value of an input of the slave device;
   responsive to the detected change, asserting a request for service for servicing of the slave device by a master device of an I2C bus, the request for service asserted at a node independent of the I2C bus, and the node dedicated to use for requests for service;
   latching the request for service, such that the request for service remains asserted regardless of a further change in the input value at the input of the slave device; and
   de-asserting the request for service in response to interrogation of the slave device by the master device using the I2C bus.

17. The computer-readable medium of claim 16, the computer-executable instructions further performing steps comprising:
   storing values of one or more inputs to the slave device;
   comparing the stored values to current values of the one or more inputs; and
   determining that one of the stored values is different from the corresponding current value, wherein the stored values are logic states of the one or more inputs and the current values are current logic states of the one or more inputs.

18. The computer-readable medium of claim 16, wherein the computer-executable instructions conform to an I2C serial communication protocol.

19. The computer-readable medium of claim 16, wherein the computer-executable instructions conform to an SMBus serial communication protocol.

20. A slave device, comprising:
   means for detecting a change in a input value of an input of the slave device, and for asserting a request for service for servicing the slave device by a master device of a serial data transfer bus, the request for service asserted at a node independent of the serial data transfer bus, the node dedicated to use for requests for service;
   means for latching the request for service, within the slave device, such that the request for service remains asserted regardless of a further change in the input value of the input of the slave device; and
   means for de-asserting the request for service in response to interrogation of the slave device by the master device using the serial data transfer bus.

21. The method of claim 20, wherein latching means comprises means for programmably enabling and disabling the latching means.

22. The method of claim 20, wherein the detecting means comprises means for storing values of one or more inputs to the slave device.

23. The method of claim 22, wherein the detecting means comprises means for comparing the stored values to current values of the one or more inputs.

24. The method of claim 23, wherein the detecting means comprises means for determining that one of the stored values is different from the corresponding current value.

* * * * *